United States Patent
Chang et al.

(10) Patent No.: US 11,572,428 B2
(45) Date of Patent: Feb. 7, 2023

(54) ACRYLATE COMB DISPERSING AGENT AND PREPARATION METHOD AND USE THEREOF, AND WHITE INK-JET COLOR PASTE AND PREPARATION METHOD THEREOF

(71) Applicant: Zhuhai Trendvision New Materials Co., Ltd., Jinwan Zhuhai (CN)

(72) Inventors: Yun-chieh Chang, Zhuhai (CN); Guojing Wei, Zhuhai (CN); Xiangmei Tao, Zhuhai (CN)

(73) Assignee: Zhuhai Trendvision New Materials Co., Ltd., Zhuhai (CN)

( * ) Notice: Subject to any disclaimer, the term of this patent is extended or adjusted under 35 U.S.C. 154(b) by 121 days.

(21) Appl. No.: 17/147,664

(22) Filed: Jan. 13, 2021

(65) Prior Publication Data

US 2021/0214480 A1 Jul. 15, 2021

(30) Foreign Application Priority Data

Jan. 13, 2020 (CN) .......................... 202010030757.0

(51) Int. Cl.
*C08F 220/18* (2006.01)
*C08K 3/22* (2006.01)
*C09D 17/00* (2006.01)

(52) U.S. Cl.
CPC .......... *C08F 220/18* (2013.01); *C09D 17/008* (2013.01); *C08K 3/22* (2013.01); *C08K 2003/2241* (2013.01)

(58) Field of Classification Search
CPC ....... C08F 220/18; C09D 17/008; C08K 3/22; C08K 2003/2241
USPC .......................................................... 524/401
See application file for complete search history.

(56) References Cited

FOREIGN PATENT DOCUMENTS

CN 102040711 A * 5/2011

* cited by examiner

*Primary Examiner* — Kelechi C Egwim
(74) *Attorney, Agent, or Firm* — Fox Rothschild LLP

(57) ABSTRACT

The present disclosure relates to the technical field of pigment dispersing agents, and provides an acrylate comb dispersing agent and a preparation method and use thereof, and a white ink-jet color paste and a preparation method thereof. The dispersing agent provided by the present disclosure is similar to a comb in structure and is synthesized from a hydrophobic monomer (comb handle) and a hydrophilic macromonomer (comb teeth). The acrylate comb dispersing agent provided by the present disclosure is good in dispersity, capable of stably dispersing titanium dioxide, relatively low in molecular weight and capable of meeting the requirements of ink-jet ink. The white ink-jet color paste provided by the present disclosure is strong in stability and low in viscosity, is not easy to settle and flocculate, and meets the requirements of the ink-jet ink.

18 Claims, No Drawings

ACRYLATE COMB DISPERSING AGENT AND PREPARATION METHOD AND USE THEREOF, AND WHITE INK-JET COLOR PASTE AND PREPARATION METHOD THEREOF

CROSS-REFERENCE TO RELATED APPLICATIONS

This application claims priority under 35 U.S.C. § 119(e) to Chinese Patent Application No. 202010030757.0, filed Jan. 13, 2020. The foregoing application is incorporated by reference herein.

TECHNICAL FIELD

The present disclosure relates to the technical field of pigment dispersing agents, and particularly relates to an acrylate comb dispersing agent and a preparation method and use thereof, and a white ink-jet color paste and a preparation method thereof.

BACKGROUND

Titanium dioxide is a most common white pigment that is currently used in coatings, inks, plastics and the like. Since that specific weight of titanium dioxide is large (4.23 g/cm3), it is easy to precipitate in a liquid phase and thus is difficult to produce a stable color paste. Especially in the ink-jet ink for which low viscosity is required, it is more likely to produce precipitation and flocculation, and thus cause problems such as inclined jet, ink breaking and print head clogging in jet printing. Therefore, in the field of ink-jet ink preparation, there is an urgent need for an aqueous titanium dioxide color paste with high stability.

Currently, commercial dispersants for titanium dioxide are rarely specifically designed for ink-jet inks. Because the ink-jet ink needs to pass through a micron-sized print head, the dispersing agent is required to have a short molecular length and a small molecular weight, so that the stability requirement under a low-viscosity system can be met. The current commercial dispersing agent is not suitable for an ink-jet color paste, and the stability of the titanium dioxide color paste is poor, so that the requirement of the ink-jet ink cannot be met.

SUMMARY

In view of this, the present disclosure provides an acrylate comb dispersing agent and a preparation method and use thereof, and a white ink-jet color paste and a preparation method thereof. The acrylate comb dispersing agent provided by the present disclosure is capable of stably dispersing titanium dioxide, can be used for preparing a paste with strong stability, and is capable of meeting the requirements of ink-jet ink.

In order to realize the aforementioned objective of the present disclosure, the present disclosure provides the following technical solutions.

Provided is an acrylate comb dispersing agent, which is prepared from the following components in percentage by mass: 20-50% of a hydrophilic macromonomer, 30-50% of a hydrophobic monomer, 0.1-1% of a first initiator and 10-30% of a first solvent; wherein the hydrophobic monomer is a hydrophobic acrylate monomer and/or a hydrophobic olefinic monomer;

the acrylate comb dispersing agent has a molecular weight lower than 30,000;

the hydrophilic macromonomer has a molecular weight lower than 3,000;

the hydrophilic macromonomer is prepared from the following components in percentage by mass: 25-50% of a hydrophilic monomer, 0.1-1% of a second initiator, 0.1-1% of a chain transfer agent, 0.1-1% of a capping agent, and 47-74.7% of a second solvent; wherein the hydrophilic monomer is a hydrophilic acrylate monomer and/or a hydrophilic olefinic monomer;

the hydrophilic monomer and the hydrophobic monomer are not olefinic monomers at the same time.

Preferably, the hydrophobic acrylate monomer includes one or more of dimethylaminoethyl methacrylate, methyl methacrylate, ethoxy triethylene glycol methacrylate, isobornyl methacrylate, dimethylaminoethyl acrylate, diethylaminoethyl methacrylate, 1,6-hexanediol diacrylate, 1,4-butanediol diacrylate, and dipropylene glycol diacrylate; and the hydrophobic olefinic monomer includes N-acryloyl morpholine and/or N-vinylpyrrolidone.

Preferably, the structure of the hydrophilic acrylate monomer contains one or more of an amine group, an amide group, a carboxylic acid group, and a hydroxyl group.

Preferably, the hydrophilic acrylate monomer includes one or more of acrylic acid, methacrylic acid, hydroxyethyl methacrylate, maleic anhydride, and ethylene glycol dimethacrylate; and the hydrophilic olefinic monomer includes acrylamide and/or N,N-dimethylacrylamide.

Preferably, the first initiator and the second initiator independently include one or more of azobisisobutylimidazoline hydrochloride, azobisisoheptonitrile, azobisisobutyl amidine hydrochloride, azobisisobutyronitrile, azobisisovaleronitrile, azobiscyclohexanecarbonitrile, dimethyl azobisisobutyrate, azobiscyanovaleric acid and azoisobutyronitrile formamide;

the chain transfer agent includes one or more of aliphatic thiol, carbon tetrachloride, dithiol ester, iodoform, 1-chloro-1-iodoalkane, 2,4-diphenyl-4-methyl-1-pentene and 3-isooctyl mercaptopropionate;

the capping agent includes one or more of hexamethylene diisocyanate, tert-butyl peroxy-2-ethylhexanoate and methyl ethyl ketoxime;

the first solvent and the second solvent independently includes one or more of ethanol, n-propanol, isopropanol, butanone, methyl isobutyl ketone, ethyl acetate, isopropyl acetate, dichloromethane, acetone, dichloroethane, toluene, xylene, tetrahydrofuran, and cyclohexanone.

The present disclosure provides a method for preparing the acrylate comb dispersing agent of the aforementioned solution, including the steps of:

(1) mixing a hydrophilic monomer, a chain transfer agent and a second solvent, and then adding a second initiator for reaction to obtain a reaction solution;

(2) mixing the reaction solution obtained in the step (1) with a capping agent for reaction to obtain a hydrophilic macromonomer; and (3) mixing a hydrophobic monomer and a first solvent, and then adding the hydrophilic macromonomer and a first initiator for reaction to obtain the acrylate comb dispersing agent.

Preferably, all of the temperatures of the reactions in the steps (1), (2) and (3) are 5-10° C. below the boiling point of the solvent as used.

The present disclosure provides use of the acrylate comb dispersing agent of the aforementioned solution or an acrylate comb dispersing agent prepared by the preparation method of the aforementioned solution in the dispersion of titanium dioxide.

The present disclosure provides a white ink-jet color paste including the following components in percentage by mass: 2-30% of the acrylate comb dispersing agent according to any one of claims 1-5 or an acrylate comb dispersing agent prepared by the preparation method according to any one of claims 6-7, 20-60% of titanium dioxide, 1-5% of a neutralizing agent, and 5-77% of water.

The present disclosure provides a method for preparing the white ink-jet color paste of the aforementioned solution, including the following steps:

mixing a neutralizing agent, an acrylate comb dispersing agent and water, and then mixing the obtained mixed solution and titanium dioxide to obtain a pre-dispersion solution; and grinding and filtering the pre-dispersion solution in sequence to obtain the white ink-jet color paste.

The present disclosure provides an acrylate comb dispersing agent. In the present disclosure, the hydrophilic acrylate monomer or the hydrophilic olefinic monomer, the chain transfer agent, the second initiator and the capping agent are used as raw materials to synthesize the hydrophilic macromonomer (comb teeth) with a low molecular weight (lower than 3,000), wherein a carbon-carbon double bond is retained at the terminal of the hydrophilic macromonomer, such that the hydrophilic macromonomer can be polymerized with the hydrophobic monomer (comb handle); and the hydrophobic monomer is polymerized with the hydrophilic macromonomer under the action of the second initiator to obtain the acrylate comb dispersing agent with a low molecular weight (lower than 30,000). The acrylate comb dispersing agent provided by the present disclosure is good in dispersity, capable of stably dispersing titanium dioxide, relatively low in molecular weight and capable of meeting the requirements of ink-jet ink.

The present disclosure also provides a white ink-jet color paste. The white ink-jet color paste is prepared by dispersing titanium dioxide with the acrylate comb dispersing agent of the present disclosure. The resultant paste is strong in stability and low in viscosity, is not easy to settle and flocculate, and meets the requirements of the ink-jet ink.

DESCRIPTION OF THE EMBODIMENTS

The present disclosure provides an acrylate comb dispersing agent, which is prepared from the following components in percentage by mass: 20-50% of a hydrophilic macromonomer, 30-50% of a hydrophobic monomer, 0.1-1% of a first initiator and 10-30% of a first solvent;

the hydrophilic macromonomer is prepared from the following components in percentage by mass: 25-50% of a hydrophilic monomer, 0.1-1% of a second initiator, 0.1-1% of a chain transfer agent, 0.1-1% of a capping agent, and 47-74.7% of a second solvent.

In the present disclosure, the acrylate comb dispersing agent has a molecular weight lower than 30,000, preferably of 20,000-30,000, and more preferably of 21,530-27,250.

The raw material for preparing the acrylate comb dispersing agent of the present disclosure includes 20-50%, preferably 25-45%, and further preferably 30-40% of the hydrophilic macromonomer in percentage by mass. In the present disclosure, the hydrophilic macromonomer has a molecular weight lower than 3,000, preferably 2,000-3,000, and more preferably 2,150-2,730. In the present disclosure, if the molecular weight of the hydrophilic macromonomer is too large, the comb teeth of the dispersing agent will be too long, such that the pigment dispersion will be precipitated due to occurrence of a twisting phenomenon, and if the molecular weight is too small, the comb teeth of the dispersing agent will be too short, such that the steric hindrance between the pigment dispersions will be insufficient and thus cause flocculation. The method provided by the present disclosure is to control the molecular weight of the hydrophobic macromonomer between 2,000-3,000, so that a dispersing agent which has a lower molecular weight and is suitable for use in ink-jet ink can be obtained.

In the present disclosure, the hydrophilic macromonomer is prepared from the following components in percentage by mass: 25-50% of a hydrophilic monomer, 0.1-1% of a second initiator, 0.1-1% of a chain transfer agent, 0.1-1% of a capping agent, and 47-74.7% of a second solvent; and preferably prepared from the following components in percentage by mass: 30-45% of a hydrophilic acrylate monomer, 0.3-0.6% of the second initiator, 0.3-0.6% of the chain transfer agent, 0.3-0.6% of the capping agent, and 50-65% of the second solvent.

In the present disclosure, the hydrophilic monomer is a hydrophilic acrylate monomer and/or a hydrophilic olefinic monomer; the structure of the hydrophilic acrylate monomer preferably contains one or more of an amine group, an amide group, a carboxylic acid group, and a hydroxyl group; in particular, the hydrophilic acrylate monomer preferably includes one or more of acrylic acid (AA), methacrylic acid (MAA), hydroxyethyl methacrylate, maleic anhydride, and ethylene glycol dimethacrylate; and the hydrophilic olefinic monomer preferably includes acrylamide (AM) and/or N,N-dimethylacrylamide (DMAA).

In the present disclosure, the second initiator preferably includes one or more of azobisisobutylimidazoline hydrochloride (Vazo 44), azobisisoheptonitrile (Vazo 52), azobisisobutyl amidine hydrochloride (Vazo 56), azodiisobutyronitrile (Vazo 64), azobisisovaleronitrile (Vazo 67), azobiscyclohexanecarbonitrile (Vazo 88), dimethyl azobisisobutyrate, azobiscyanovaleric acid, and azoisobutyronitrile formamide; the chain transfer agent preferably includes one or more of an aliphatic thiol, carbon tetrachloride, dithiol ester (CPDB), iodoform, 1-chloro-1-iodoalkane, 2,4-diphenyl-4-methyl-1-pentene (AMSD) and 3-isooctyl mercaptopropionate (IDMP); the aliphatic thiol is preferably dodecylthiol; and the capping agent preferably includes one or more of hexamethylene diisocyanate (HDI), tert-butyl peroxy-2-ethylhexanoate and methyl ethyl ketoxime.

In the present disclosure, the second solvent preferably includes one or more of ethanol, n-propanol, isopropanol, butanone, methyl isobutyl ketone, ethyl acetate, isopropyl acetate, dichloromethane, acetone, dichloroethane, toluene, xylene, tetrahydrofuran, and cyclohexanone.

The raw material for preparing the acrylate comb dispersing agent of the present disclosure includes 30-50%, and preferably 35-45% of the hydrophobic monomer in percentage by mass. In the present disclosure, the hydrophobic monomer is a hydrophobic acrylate monomer and/or a hydrophobic olefinic monomer; the hydrophobic acrylate monomer includes one or more of dimethylaminoethyl methacrylate, methyl methacrylate, ethoxy triethylene glycol methacrylate, isobornyl methacrylate, dimethylaminoethyl acrylate, diethylaminoethyl methacrylate, 1,6-hexanediol diacrylate, 1,4-butanediol diacrylate, and dipropylene glycol diacrylate; and the hydrophobic olefinic monomer includes N-acryloyl morpholine and/or N-vinylpyrrolidone;

in the present disclosure, the hydrophilic monomer and the hydrophobic monomer are not olefinic monomers at the same time.

The raw material for preparing the acrylate comb dispersing agent of the present disclosure includes 0.1-1%, and preferably 0.2-0.8% of the first initiator in percentage by mass. In the present disclosure, the optional kinds of the first initiator are preferably the same as those of the second initiator, and will not described in detail anymore here.

The raw material for preparing the acrylate comb dispersing agent of the present disclosure includes 10-30%, and preferably 15-25% of the first solvent in percentage by mass. In the present disclosure, the optional kinds of the first solvent are the same as those of the second solvent, and will not described in detail anymore here.

The present disclosure provides a method for preparing the acrylate comb dispersing agent of the aforementioned solution, including the steps of:

(1) mixing a hydrophilic monomer, a chain transfer agent and a second solvent, and then adding a second initiator for reaction to obtain a reaction solution;

(2) mixing the reaction solution obtained in the step (1) with a capping agent for reaction to obtain a hydrophilic macromonomer; and (3) mixing a hydrophobic monomer and a first solvent, and adding the hydrophilic macromonomer and a first initiator for reaction to obtain the acrylate comb dispersing agent.

In the present disclosure, the hydrophilic monomer, the chain transfer agent and the second solvent are mixed, and then added with the second initiator for reaction to obtain the reaction solution. In the present disclosure, the temperature of the reaction in the step (1) is preferably 5-10° C. below the boiling point of the second solvent; when the second solvent is a mixed solvent, the reaction temperature of the present disclosure is subject to 5-10° C. below the boiling point of the boiling solvent; the apparatus for the reaction is preferably a four-neck flask equipped with stirring and reflux condensation devices; In the present disclosure, preferably the apparatus is introduced with nitrogen for 10 min firstly, then subsequently added with partial of the second solvent, the hydrophilic monomer and the chain transfer agent, stirred to dissolve the hydrophilic monomer and the chain transfer agent, and heated to 5-10° C. below the boiling point of the solvent, then the second initiator is dissolved in partial of the second solvent and slowly added dropwise into the mixed solution of the hydrophilic monomer and the chain transfer agent; in the present disclosure, the time for the dropwise addition of the second initiator is preferably 90-120 min, and the reaction is preferably continued for 120 min after the dropwise addition of the initiator is completed.

In the present disclosure, after the reaction in the step (1) is completed, the obtained reaction solution and the capping agent are mixed for reaction to obtain the hydrophilic macromonomer. In the present disclosure, the temperature of the reaction in the step (2) is preferably the same as that in the step (1); in the present disclosure, the temperature of the reaction solution obtained in the step (1) is preferably maintained at 5-10° C. below the temperature of the second solvent, and then the capping agent is dissolved in partial of the second solvent and slowly added dropwise into the reaction solution; the time for the dropwise addition of the capping agent is preferably 60 min, and the reaction is preferably continued for 60 min after the dropwise addition is completed; the present disclosure has no specific requirement on the volume of the second solvent for dissolving the hydrophilic monomer and the chain transfer agent, the volume of the second solvent for dissolving the second initiator and the volume of the second solvent for dissolving the capping agent, as long as the total amount of the second solvent meets the requirement of the percentage mass content in the aforementioned solution.

In the present disclosure, after the hydrophilic macromonomer is obtained, the hydrophobic monomer and the first solvent are mixed, and then the hydrophilic macromonomer and the first initiator are added into the mixed solution for reaction to obtain the acrylate comb dispersing agent. In the present disclosure, the temperature of the reaction in the step (3) is preferably 5-10° C. below the boiling point of the first solvent; the apparatus for the reaction is preferably a four-neck flask equipped with stirring and reflux condensation devices; in the present disclosure, preferably the hydrophobic monomer is firstly dissolved in partial of the first solvent, uniformly stirred and heated to 5-10° C. below the boiling point of the first solvent, then the hydrophilic macromonomer and the first initiator are respectively dissolved in partial of the first solvent, and subsequently the solution of the hydrophilic macromonomer and the solution of the first initiator are injected into the solution of the hydrophobic monomer in a parallel flow manner; and in the present disclosure, the time for the parallel flow injection is preferably 180 min, and the reaction is preferably continued for 60 min after the injection is completed. The present disclosure has no specific requirement on the volume of the first solvent for dissolving the hydrophobic monomer, the volume of the first solvent for dissolving the first initiator and the volume of the first solvent for dissolving the hydrophilic macromonomer, as long as the total amount of the first solvent meets the requirement of percentage mass content of the aforementioned solution.

The present disclosure provides use of the acrylate comb dispersing agent of the aforementioned solution in the dispersion of titanium dioxide. The acrylate comb dispersing agent provided by the present disclosure can stably disperse titanium dioxide in water and an organic solvent. In the present disclosure, all of the commercially-available titanium dioxide are subjected to hydrophobic treatment on the surface thereof, so that the titanium dioxide powder will not be agglomerated while the flowability of the powder is increased and the convenience for processing the powder is increased, if it is wanted to make titanium dioxide be stably dispersed in the liquid, it is necessary to separate the particles of titanium dioxide and adsorb the dispersing agent on the surfaces of the particles to prevent the particles from flocculating by steric hindrance; the comb handle of the acrylate comb dispersing agent provided by the present disclosure is synthesized by using hydrophobic monomers without aromatic groups and can be adsorbed on the surface of titanium dioxide, and the comb teeth of the acrylate comb dispersing agent provided by the present disclosure are synthesized by hydrophilic monomers and are capable of distributing titanium dioxide particles stably in water; furthermore, a general dispersing agent is in a straight chain shape, and its length is more than 30 nanometers (i.e., the molecular weight is more than 10,000) although the length is controlled, so that it is difficult for it to meet the requirements of the ink-jet color paste, while the comb dispersing agent provide by the present disclosure only has the comb teeth part in water, and the present disclosure controls the length of the comb teeth to be 10 nanometers (i.e., the molecular weight is lower than 3,000), so that the length of the whole dispersing agent on the surface of titanium dioxide is controlled, no twisting and precipitation phenomenons occur due to the too long dispersing agent, and thus titanium dioxide can meet the requirements of the ink-jet color paste while being stably dispersed.

The present disclosure also provides a white ink-jet color paste which includes the following components in percentage by mass: 2-30% of the acrylate comb dispersing agent, 20-60% of titanium dioxide, 1-5% of a neutralizing agent, and 5-77% of water, and preferably includes the following components in percentage by mass: 5-25% of the acrylate comb dispersing agent, 25-58% of titanium dioxide, 2-3% of the neutralizing agent, and 10-60% of water.

In the present disclosure, the neutralizing agent preferably includes one or more of sodium hydroxide, potassium hydroxide, monoethanolamine (MEA), diethanolamine (DEA), triethanolamine (TEA), N-methyl diethanolamine (MDEA), N-ethyl diethanolamine (EDEA), N-propyl diethanolamine (PDEA), and N-butyl diethanolamine (BDEA); and the neutralizing agent can modify the dispersing agent from hydrophobicity to hydrophily, so that the dispersing agent can stably exist in the aqueous-phase color paste.

The white ink-jet color paste provided by the present disclosure takes water as a solvent, and is a water-borne color paste, and the dispersion stability of titanium dioxide in it is strong and thus flocculation and precipitation is less likely to occur. When the white ink-jet color paste of the present disclosure is applied in ink-jet printing, the problems of such as inclined jet, ink breaking and print head clogging are less likely to occur.

The present disclosure provides a method for preparing the white ink-jet color paste of the aforementioned solution, including the following steps:

mixing a neutralizing agent, an acrylate comb dispersing agent and water, and then mixing the mixed solution and titanium dioxide to obtain a pre-dispersion solution; and grinding and filtering the pre-dispersion solution in sequence to obtain the white ink-jet color paste.

In the present disclosure, preferably the neutralizing agent is firstly stirred in water for dissolution, then the acrylate comb dispersing agent is added and stirred for dissolution, and finally titanium dioxide is added into the mixed solution of the neutralizing agent and the acrylate comb dispersing agent, and is stirred for 60 min to fully wet titanium dioxide, so as to obtain a pre-dispersion.

In the present disclosure, the grinding is preferably carried out in a sand mill in the present disclosure, it is preferable to grind until the average particle size of titanium dioxide is 250 nm, and then filter to remove large particles and colloids, so as to obtain a stable white ink-jet color paste.

The technical solutions in the present disclosure will be clearly and completely described below in conjunction with the Examples of the present disclosure.

Example 1

(1) Into a dry and clean four-necked flask equipped with stirring and reflux condensation devices introduced was nitrogen firstly for 10 minutes, and then sequentially 150 g of ethyl acetate, 100 g of acrylic acid, and 5 g of dodecylthiol were sequentially poured into the four-necked flask and heated under uniform stirring, with the temperature being controlled at 72° C.

(2) 4 g of Vazo 44 and 40 g of isopropanol were mixed under stirring, and the mixture was added into the four-necked flask in a slow dropwise addition manner for 90 minutes at a temperature maintained at 72° C. The temperature was maintained at 72° C. after the addition, and stirring was continued for 120 minutes.

(3) 6 g of hexamethylene diisocyanate and 60 g of isopropanol were mixed under stirring, and the mixture was added into the four-necked flask in a slow dropwise addition manner for 60 minutes at a temperature maintained at 72° C. The temperature was maintained at 72° C. after the addition, and stirring was continued for 60 minutes to obtain 350 g of a hydrophilic acrylate macromonomer.

(4) Into a dry and clean four-necked flask equipped with stirring and reflux condensation devices introduced was nitrogen firstly for 10 minutes, and then 50 g of isopropanol, 157 g of dimethylaminoethyl methacrylate and 143 g of dimethylaminoethyl acrylate were sequentially poured into the four-necked flask, and heated under uniform stirring, with the temperature being controlled at 77° C.

(5) 350 g of the hydrophilic acrylate macromonomer and 100 g of isopropanol were mixed under stirring, 5 g of Vazo 44 and 50 g of isopropanol were mixed under stirring, and the two solutions were injected into the four-necked flask of the step (4) in the same amount in a parallel flow manner for a time of 180 minutes at a temperature maintained at 72° C. The temperature was maintained at 72° C. after the addition, and stirring was continued for 60 minutes to obtain 840 g of the comb dispersing agent.

Example 2

(1) Into a dry and clean four-necked flask equipped with stirring and reflux condensation devices introduced was nitrogen firstly for 10 minutes, and then 150 g of butanone, 100 g of methacrylic acid and 5 g of 2,4-diphenyl-4-methyl-1-pentene were sequentially poured into the four-necked flask and heated under uniform stirring, with the temperature being controlled at 70° C.

(2) 4 g of Vazo 64 and 40 g of butanone were mixed under stirring, and the mixture was added into the four-necked flask in a slow dropwise addition manner for 90 minutes at a temperature maintained at 70° C. The temperature was maintained at 70° C. after the addition, and stirring was continued for 120 minutes.

(3) 6 g of tert-butyl peroxy-2-ethylhexanoate and 60 g of butanone were mixed under stirring, and the mixture was added into the four-necked flask in a slow dropwise addition manner for 60 minutes at a temperature maintained at 70° C. The temperature was maintained at 70° C. after the addition, and stirring was continued for 60 minutes to obtain 350 g of a hydrophilic acrylate macromonomer.

(4) Into a dry and clean four-necked flask equipped with stirring and reflux condensation devices introduced was nitrogen firstly for 10 minutes, and then 50 g of butanone, 100 g of methyl methacrylate and 198 g of 1,4-butanediol diacrylate were sequentially poured into the four-necked flask and heated under uniform stirring, with the temperature being controlled at 70° C.

(5) 350 g of the hydrophilic acrylate macromonomer and 100 g of butanone were mixed under stirring, 5 g of Vazo 64 and 50 g of butanone were mixed under stirring, and the two solutions were injected into the four-necked flask of the step (4) in the same amount in a parallel flow manner for a time of 180 minutes at a temperature maintained at 70° C. The temperature was maintained at 70° C. after the addition, and stirring was continued for 60 minutes to obtain 840 g of the comb dispersing agent.

Example 3

(1) Into a dry and clean four-necked flask equipped with stirring and reflux condensation devices introduced was nitrogen firstly for 10 minutes, and then 150 g of butanone, 100 g of acrylamide and 5 g of dithiol ester (CPDB) were sequentially poured into the four-necked flask and heated under uniform stirring, with the temperature being controlled at 72° C.

(2) 4 g of Vazo 52 and 40 g of butanone were mixed under stirring, and the mixture was added into the four-necked flask in a slow dropwise addition manner for 90 minutes at a temperature maintained at 72° C. The temperature was maintained at 72° C. after the addition, and stirring was continued for 120 minutes.

(3) 6 g of methyl ethyl ketoxime and 60 g of butanone were mixed under stirring, and the mixture was added into the four-necked flask in a slow dropwise addition manner for 60 minutes at a temperature maintained at 72° C. The temperature was maintained at 72° C. after the addition, and stirring was continued for 60 minutes to obtain 350 g of a hydrophilic acrylate macromonomer.

(4) Into a dry and clean four-necked flask equipped with stirring and reflux condensation devices introduced was nitrogen firstly for 10 minutes, and then 50 g of isopropanol, 222 g of isobornyl methacrylate, and 111 g of N-vinylpyrrolidone were sequentially poured into the four-necked flask and heated under uniform stirring, with the temperature being controlled at 77° C.

(5) 350 g of the hydrophilic acrylate macromonomer and 100 g of isopropanol were mixed under stirring. Also, 5 g of Vazo 52 and 50 g of isopropanol were mixed under stirring, and the two solutions were injected into the four-necked flask of the step (4) in the same amount in a parallel flow manner for a time of 180 minutes at a temperature maintained at 77° C. The temperature was maintained at 72° C. after the addition, and stirring was continued for 60 minutes to obtain 890 g of the comb dispersing agent.

Example 4

(1) Into a dry and clean four-necked flask equipped with stirring and reflux condensation devices introduced was nitrogen firstly for 10 minutes, and then 150 g of butanone, 100 g of hydroxyethyl methacrylate, and 5 g of 3-isooctyl mercaptopropionate (IDMP) were sequentially poured into the four-necked flask and heated under uniform stirring, with the temperature being controlled at 72° C.

(2) 4 g of Vazo 56 and 40 g of butanone were mixed under stirring, and the mixture was added into the four-necked flask in a slow dropwise addition manner for 90 minutes at a temperature maintained at 72° C. The temperature was maintained at 72° C. after the addition, and stirring was continued for 120 minutes.

(3) 6 g of hexamethylene diisocyanate and 60 g of butanone were mixed under stirring, and the mixture was added into the four-necked flask in a slow dropwise addition manner for 60 minutes at a temperature maintained at 72° C. The temperature was maintained at 72° C. after the addition, and stirring was continued for 60 minutes to obtain 350 g of a hydrophilic acrylate macromonomer.

(4) Into a dry and clean four-necked flask equipped with stirring and reflux condensation devices introduced was nitrogen firstly for 10 minutes, and then 50 g of butanone, 185 g of diethylaminoethyl methacrylate and 242 g of dipropylene glycol diacrylate were sequentially poured into the four-necked flask and heated under uniform stirring, with the temperature being controlled at 72° C.

(5) 350 g of the hydrophilic acrylate macromonomer and 100 g of butanone were mixed under stirring. Also, 5 g of Vazo 56 and 50 g of butanone were mixed under stirring, and the two solutions were injected into the four-necked flask of the step (4) in the same amount in a parallel flow manner for a time of 180 minutes at a temperature maintained at 72° C. The temperature was maintained at 72° C. after the addition, and stirring was continued for 60 minutes to obtain 1090 g of the comb dispersing agent.

Application Examples 1-4

White ink-jet color pastes were prepared using the comb dispersing agents prepared in Examples 1-4, respectively, and the preparation process was as follows:

(1) 5.2 g of sodium hydroxide and 142.8 g of deionized water were mixed for dissolution, then added with 52 g of the comb dispersing agent, and mixed for dissolution.

(2) The solution of the step (1) was added with 200 g of titanium dioxide, and stirred for 60 minute to completely wet the coloring material to obtain a pre-dispersion.

(3) The pre-dispersion was fed into a sand mill for grinding until the average particle size of the toner reached 250 nm, and filtered to remove large particles and colloids, so as to obtain 400 g of a stable white color paste.

Performance Test:

Molecular weight detection: the hydrophilic acrylate macromonomers and the comb dispersing agents prepared in Example 1-4 were detected for molecular weights by using a gel permeation chromatograph LC-20AD available from Shimadzu.

The viscosity, particle size, stability and filterability of the white ink-jet color pastes prepared in Application Examples 1-4 were tested, and the testing methods were as follows.

The viscosity was detected by using a Wells cone-plate viscometer available from Brookfield.

The particle size was detected by using a Nano S90 nano particle size instrument available from Malvern.

The stability test was to age the color paste at 60° C. for 7 days, and if the particle size change was less than 10% and the viscosity change was less than 5%, the color paste was judged to be qualified; and on the contrary, it was judged to be unqualified.

The filterability was detected by using a Minipore PVDF 1.0-micron filter membrane, and if the filtering was within 5 min/500 g, it was judged to be qualified; and on the contrary, it is judged to be unqualified.

The test results were shown in Tables 1-2:

TABLE 1 molecular weight test results of the hydrophilic macromonomers and comb dispersing agents prepared in Examples 1-4

| Test Items | Example 1 | Example 2 | Example 3 | Example 4 |
|---|---|---|---|---|
| Molecular weight of hydrophilic macromonomer (Mw) | 2150 | 2270 | 2430 | 2730 |
| Molecular weight of the comb dispersing agent (Mw) | 21530 | 22740 | 24830 | 27250 |

TABLE 2

Performance test results of the white ink-jet color pastes prepared in Application Examples 1-4

| Test Items | Application Example 1 | Application Example 2 | Application Example 3 | Application Example 4 |
|---|---|---|---|---|
| Before aging D50 particle size (nm) | 242 | 240 | 245 | 249 |
| After aging D50 particle size (nm) | 248 | 245 | 303 | 305 |
| Before aging viscosity (cp) | 1282 | 1295 | 1293 | 1320 |
| After aging viscosity (cp) | 1294 | 1298 | 1299 | 1338 |
| Before aging Filterability test of ink prepared from 20% of the color paste | 3'42" | 3'51" | 3'28" | 3'34" |
| After aging Filterability test of ink prepared from 20% of the color paste | 4'12" | 4'20" | 3'51" | 4'08" |

As could be seen from the test results in tables 1-2, the molecular weight of the comb dispersing agent provided by the present disclosure was lower, and all of the physical property changes of the water-brone titanium dioxide ink-jet color paste prepared from the comb dispersing agent were judged to be qualified after the water-brone titanium dioxide ink-jet color paste was aged for 7 days, thereby meeting the use requirements of the ink-jet color paste.

The above description is only preferred embodiments of the present disclosure. It should be pointed out that, for those of ordinary skills in the art, several improvements and modifications can be made without departing from the principle of the present disclosure. These improvements and modifications should also be considered as falling into the claimed scope of the present disclosure.

What is claimed is:

1. An acrylate comb dispersing agent, which is prepared from the following components in percentage by mass: 20-50% of a hydrophilic macromonomer, 30-50% of a hydrophobic monomer, 0.1-1% of a first initiator and 10-30% of a first solvent; wherein the hydrophobic monomer is a hydrophobic acrylate monomer and/or a hydrophobic olefinic monomer;
   the acrylate comb dispersing agent has a molecular weight lower than 30,000;
   the hydrophilic macromonomer has a molecular weight lower than 3,000;
   the hydrophilic macromonomer is prepared from the following components in percentage by mass: 25-50% of a hydrophilic monomer, 0.1-1% of a second initiator, 0.1-1% of a chain transfer agent, 0.1-1% of a capping agent, and 47-74.7% of a second solvent; wherein the hydrophilic monomer is a hydrophilic acrylate monomer and/or a hydrophilic olefinic monomer;
   the hydrophilic monomer and the hydrophobic monomer are not olefinic monomers at the same time.

2. The acrylate comb dispersing agent according to claim 1, wherein the hydrophobic acrylate monomer comprises one or more of dimethylaminoethyl methacrylate, methyl methacrylate, ethoxy triethylene glycol methacrylate, isobornyl methacrylate, dimethylaminoethyl acrylate, diethylaminoethyl methacrylate, 1,6-hexanediol diacrylate, 1,4-butanediol diacrylate, and dipropylene glycol diacrylate; and the hydrophobic olefinic monomer comprises N-acryloyl morpholine and/or N-vinylpyrrolidone.

3. The acrylate comb dispersing agent according to claim 1, wherein the structure of the hydrophilic acrylate monomer contains one or more of an amine group, an amide group, a carboxylic acid group, and a hydroxyl group.

4. The acrylate comb dispersing agent according to claim 1, wherein the hydrophilic acrylate monomer comprises one or more of acrylic acid, methacrylic acid, hydroxyethyl methacrylate, maleic anhydride, and ethylene glycol dimethacrylate; and the hydrophilic olefinic monomer comprises acrylamide and/or N,N-dimethylacrylamide.

5. The acrylate comb dispersing agent according to claim 1, wherein the first initiator and the second initiator independently comprise one or more of azobisisobutylimidazoline hydrochloride, azobisisoheptonitrile, azobisisobutyl amidine hydrochloride, azobisisobutyronitrile, azobisisovaleronitrile, azobiscyclohexanecarbonitrile, dimethyl azobisisobutyrate, azobiscyanovaleric acid and azoisobutyronitrile formamide;
   the chain transfer agent comprises one or more of aliphatic thiol, carbon tetrachloride, dithiol ester, iodoform, 1-chloro-1-iodoalkane, 2,4-diphenyl-4-methyl-1-pentene and 3-isooctyl mercaptopropionate;
   the capping agent comprises one or more of hexamethylene diisocyanate, tert-butyl peroxy-2-ethylhexanoate and methyl ethyl ketoxime;
   the first solvent and the second solvent independently comprises one or more of ethanol, n-propanol, isopropanol, butanone, methyl isobutyl ketone, ethyl acetate, isopropyl acetate, dichloromethane, acetone, dichloroethane, toluene, xylene, tetrahydrofuran, and cyclohexanone.

6. A method for preparing the acrylate comb dispersing agent according to claim 1, comprising the steps of:
   (1) mixing a hydrophilic monomer, a chain transfer agent and a second solvent, and then adding a second initiator for reaction to obtain a reaction solution;
   (2) mixing the reaction solution obtained in the step (1) with a capping agent for reaction to obtain a hydrophilic macromonomer; and
   (3) mixing a hydrophobic monomer and a first solvent, and then adding the hydrophilic macromonomer and a first initiator for reaction to obtain the acrylate comb dispersing agent.

7. A method for preparing the acrylate comb dispersing agent according to claim 6, wherein the hydrophobic acrylate monomer comprises one or more of dimethylaminoethyl methacrylate, methyl methacrylate, ethoxy triethylene glycol methacrylate, isobornyl methacrylate, dimethylaminoethyl acrylate, diethylaminoethyl methacrylate, 1,6-hexanediol diacrylate, 1,4-butanediol diacrylate, and dipropylene glycol diacrylate; and the hydrophobic olefinic monomer comprises N-acryloyl morpholine and/or N-vinylpyrrolidone.

8. The method for preparing the acrylate comb dispersing agent according to claim 6, wherein the structure of the hydrophilic acrylate monomer contains one or more of an amine group, an amide group, a carboxylic acid group, and a hydroxyl group.

9. The method for preparing the acrylate comb dispersing agent according to claim 6, wherein the hydrophilic acrylate monomer comprises one or more of acrylic acid, methacrylic acid, hydroxyethyl methacrylate, maleic anhydride, and ethylene glycol dimethacrylate; and the hydrophilic olefinic monomer comprises acrylamide and/or N,N-dimethylacrylamide.

10. The method for preparing the acrylate comb dispersing agent according to claim 6, wherein the first initiator and the second initiator independently comprise one or more of azobisisobutylimidazoline hydrochloride, azobisisoheptonitrile, azobisisobutyl amidine hydrochloride, azobisisobutyronitrile, azobisisovaleronitrile, azobiscyclohexanecarbonitrile, dimethyl azobisisobutyrate, azobiscyanovaleric acid and azoisobutyronitrile formamide;
the chain transfer agent comprises one or more of aliphatic thiol, carbon tetrachloride, dithiol ester, iodoform, 1-chloro-1-iodoalkane, 2,4-diphenyl-4-methyl-1-pentene and 3-isooctyl mercaptopropionate;
the capping agent comprises one or more of hexamethylene diisocyanate, tert-butyl peroxy-2-ethylhexanoate and methyl ethyl ketoxime;
the first solvent and the second solvent independently comprises one or more of ethanol, n-propanol, isopropanol, butanone, methyl isobutyl ketone, ethyl acetate, isopropyl acetate, dichloromethane, acetone, dichloroethane, toluene, xylene, tetrahydrofuran, and cyclohexanone.

11. The preparation method according to claim 6, wherein all of the temperatures of the reactions in the steps (1), (2) and (3) are 5-10° C. below the boiling point of the solvent as used.

12. The preparation method according to claim 7, wherein all of the temperatures of the reactions in the steps (1), (2) and (3) are 5-10° C. below the boiling point of the solvent as used.

13. The preparation method according to claim 8, wherein all of the temperatures of the reactions in the steps (1), (2) and (3) are 5-10° C. below the boiling point of the solvent as used.

14. A white ink-jet color paste comprising the following components in percentage by mass: 2-30% of the acrylate comb dispersing agent according to claim 1, 20-60% of titanium dioxide, 1-5% of a neutralizing agent, and 5-77% of water.

15. The white ink-jet color paste comprising the following components in percentage by mass: 2-30% of the acrylate comb dispersing agent according to claim 14, 20-60% of titanium dioxide, 1-5% of a neutralizing agent, and 5-77% of water;
wherein the hydrophobic acrylate monomer comprises one or more of dimethylaminoethyl methacrylate, methyl methacrylate, ethoxy triethylene glycol methacrylate, isobornyl methacrylate, dimethylaminoethyl acrylate, diethylaminoethyl methacrylate, 1,6-hexanediol diacrylate, 1,4-butanediol diacrylate, and dipropylene glycol diacrylate; and the hydrophobic olefinic monomer comprises N-acryloyl morpholine and/or N-vinylpyrrolidone.

16. The white ink-jet color paste comprising the following components in percentage by mass: 2-30% of the acrylate comb dispersing agent according to claim 14, 20-60% of titanium dioxide, 1-5% of a neutralizing agent, and 5-77% of water;
wherein the structure of the hydrophilic acrylate monomer contains one or more of an amine group, an amide group, a carboxylic acid group, and a hydroxyl group.

17. The white ink-jet color paste comprising the following components in percentage by mass: 2-30% of the acrylate comb dispersing agent according to claim 14, 20-60% of titanium dioxide, 1-5% of a neutralizing agent, and 5-77% of water;
wherein the hydrophilic acrylate monomer comprises one or more of acrylic acid, methacrylic acid, hydroxyethyl methacrylate, maleic anhydride, and ethylene glycol dimethacrylate; and the hydrophilic olefinic monomer comprises acrylamide and/or N,N-dimethylacrylamide.

18. The white ink-jet color paste comprising the following components in percentage by mass: 2-30% of the acrylate comb dispersing agent according to claim 14, 20-60% of titanium dioxide, 1-5% of a neutralizing agent, and 5-77% of water;
wherein the first initiator and the second initiator independently comprise one or more of azobisisobutylimidazoline hydrochloride, azobisisoheptonitrile, azobisisobutyl amidine hydrochloride, azobisisobutyronitrile, azobisisovaleronitrile, azobiscyclohexanecarbonitrile, dimethyl azobisisobutyrate, azobiscyanovaleric acid and azoisobutyronitrile formamide;
the chain transfer agent comprises one or more of aliphatic thiol, carbon tetrachloride, dithiol ester, iodoform, 1-chloro-1-iodoalkane, 2,4-diphenyl-4-methyl-1-pentene and 3-isooctyl mercaptopropionate;
the capping agent comprises one or more of hexamethylene diisocyanate, tert-butyl peroxy ethylhexanoate and methyl ethyl ketoxime;
the first solvent and the second solvent independently comprises one or more of ethanol, n-propanol, isopropanol, butanone, methyl isobutyl ketone, ethyl acetate, isopropyl acetate, dichloromethane, acetone, dichloroethane, toluene, xylene, tetrahydrofuran, and cyclohexanone.

* * * * *